United States Patent
Haid et al.

(10) Patent No.: US 7,772,909 B2
(45) Date of Patent: Aug. 10, 2010

(54) SUPPLYING POWER TO, AND CLOCKING, CLOCKED LOADS

(75) Inventors: Josef Haid, Graz (AT); Walter Kargl, Graz (AT); Thomas Leutgeb, Lieboch (AT)

(73) Assignee: Infineon Technologies AG, Neubiberg (DE)

( * ) Notice: Subject to any disclaimer, the term of this patent is extended or adjusted under 35 U.S.C. 154(b) by 131 days.

(21) Appl. No.: 11/944,833

(22) Filed: Nov. 26, 2007

(65) Prior Publication Data

US 2008/0122410 A1    May 29, 2008

(30) Foreign Application Priority Data

Nov. 24, 2006    (DE) .................... 10 2006 055 638

(51) Int. Cl.
*G06F 1/04* (2006.01)
*G06F 1/00* (2006.01)

(52) U.S. Cl. ..................................... 327/291; 713/501

(58) Field of Classification Search ................. 323/224, 323/283, 282, 284; 235/380; 340/333; 327/143, 327/291; 365/233.12, 229, 227; 713/500, 713/501, 600
See application file for complete search history.

(56) References Cited

U.S. PATENT DOCUMENTS

| | | | |
|---|---|---|---|
| 6,242,938 B1 * | 6/2001 | Kessler | 324/772 |
| 6,466,126 B2 | 10/2002 | Collins et al. | |
| 6,581,842 B2 | 6/2003 | Sedlak et al. | |
| 6,847,198 B2 * | 1/2005 | Kalpakjian et al. | 323/268 |

FOREIGN PATENT DOCUMENTS

WO    WO-01/57790    8/2001

* cited by examiner

*Primary Examiner*—Shawn Riley
(74) *Attorney, Agent, or Firm*—Dickstein, Shapiro, LLP.

(57) ABSTRACT

A supply power can be fed in at a circuit arrangement for supplying power to, and clocking, clocked loads. The circuit arrangement provides a clock signal at a frequency and a supply voltage, the frequency and/or the supply voltage being able to be controlled by the circuit arrangement in such a manner that a power tapped off at the output and the supply power fed in are in a predefined relationship.

25 Claims, 2 Drawing Sheets

SUPPLYING POWER TO, AND CLOCKING, CLOCKED LOADS

CROSS-REFERENCE TO RELATED APPLICATION

This application claims priority to German Patent Application Serial No. 102006055638.0, which was filed Nov. 24, 2006, and is incorporated herein by reference in its entirety.

BACKGROUND OF THE INVENTION

The invention relates to a circuit arrangement and a method for supplying power to, and supplying a clock for, clocked loads with clock frequency regulation and/or voltage regulation.

In a circuit arrangement having clocked circuit parts, the clock frequency influences the total current consumption since the current consumption of the clocked circuit parts is proportional to the clock frequency.

In conventional circuits, the clock frequency and the operating voltage may be firmly predefined or may be set by a user. The disadvantage is that there is no response to changing power conditions. If the power provided falls in such a manner that the current needed to operate the circuit is no longer available, this results in a dip in the supply voltage.

Changing power conditions occur, for example, in a contactless chip card which is supplied with power by means of an electromagnetic field whose strength can fluctuate, as described in WO 01/57790.

BRIEF DESCRIPTION OF THE DRAWINGS

The invention is explained below using exemplary embodiments and with reference to the drawing, in which.

DETAILED DESCRIPTION OF THE INVENTION

Figure 1:
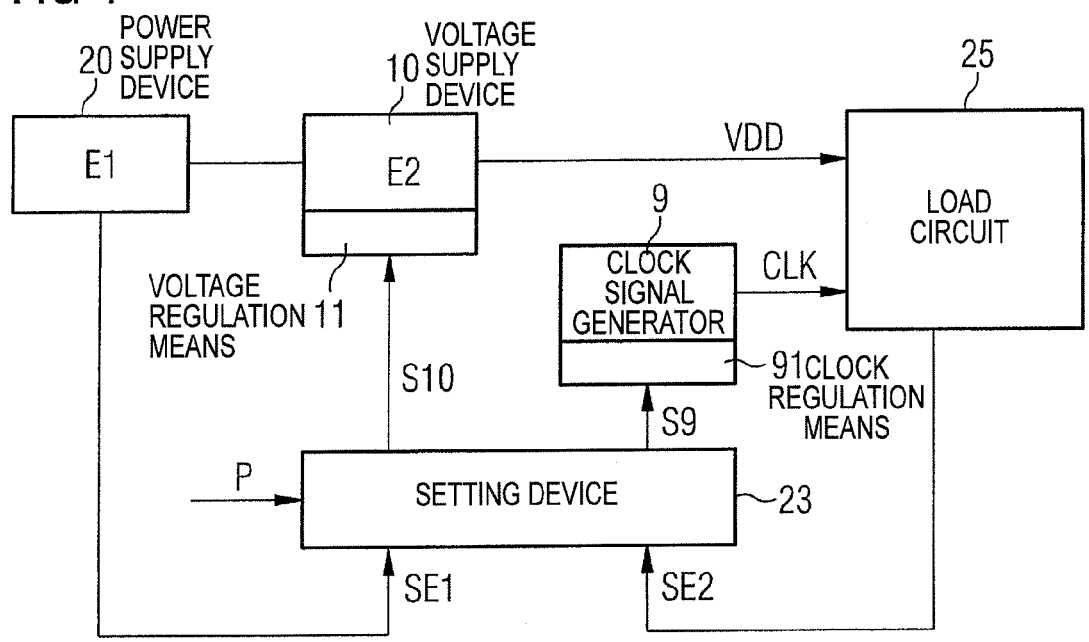
FIG. 1 diagrammatically shows the principle of supplying power to a clocked load.

The invention adapts the power supply to the power conditions and to specify a corresponding circuit arrangement and a method for this purpose.

A supply power can be fed in at the circuit arrangement for supplying power to, and clocking, clocked loads. The circuit arrangement provides a clock signal at a frequency and a supply voltage, the frequency and/or the supply voltage being able to be controlled by the circuit arrangement in such a manner that a power tapped off at the output and the supply power fed in are in a predefined relationship.

A predefined relationship can be understood as meaning that the power tapped off makes up a predefined fraction of the power fed in. It is also conceivable that a predefined absolute value cannot be tapped off. In a further embodiment, the power tapped off is maximized, with the result that it at least virtually corresponds to the power fed in.

The circuit arrangement advantageously comprises an input node at which a supply power can be fed in, and a voltage supply device which is coupled to the input node and provides a supply voltage. At least one first part of the supply power is able to be tapped off at the voltage supply device. A measuring device is coupled to the input node in order to record a second part of the supply power which is not tapped off. A clock signal generator for providing a clock signal is also provided. A setting device is coupled to the measuring device, the clock signal generator and/or the voltage supply device being able to be controlled by the setting device.

It is advantageous that operation of the circuit arrangement can be adapted to the available power.

The measuring device is advantageously in the form of a current measuring device in order to measure a current which is flowing away inside the circuit.

In one advantageous refinement, the setting device comprises a comparison device in order to compare at least one desired current value with the current recorded and to provide a clock control signal and/or a voltage control signal. The clock frequency and/or the supply voltage can thus be adapted to the power conditions.

A current to be measured by the current measuring device advantageously flows away via a voltage limiting device, the voltage limiting device being designed to regulate a voltage dropped across it in such a manner that the voltage does not exceed a predefined value. The input current which is not required by the load flows away via the voltage limiting device. At the same time, it is ensured that a predefined voltage is not exceeded in order to protect the circuit arrangement. The frequency is readjusted on the basis of the recorded current flowing away, with the result that the supply power is used by the circuit in the best possible manner without resulting in a collapse of the supply voltage. This can also be achieved by readjusting the voltage. As a result, operation of the circuit can also be set in a more accurate manner using so-called voltage scaling in addition to frequency scaling. The current consumption required is proportional to the square of the supply voltage. A reduced voltage also calls for a reduction in the frequency since a delay of transistors during changeover operations also depends on the operating voltage.

Another advantage of this approach is the higher level of stability of the circuit in comparison with circuit arrangements which have only a so-called voltage drop sensor since, in the approach described above, the intensity of the voltage dips is considerably reduced. This results in a far smaller voltage dip in the critical region, that is to say with a low power supply.

In one advantageous refinement, the voltage limiting device is in the form of a shunt which provides the functionality described above.

The corresponding control signal advantageously controls the frequency and/or the supply voltage in such a manner that it/they is/are increased or reduced in order to readjust the frequency and/or the supply voltage.

The frequency and/or the supply voltage is/are increased if the current recorded is greater than a first desired current value provided, and the frequency and/or the supply voltage is/are reduced if the current recorded is less than a second desired current value provided in order to set the current flowing away via the voltage limiting device to a fixed value as far as possible and thus to operate the circuit at an optimum operating point.

An advantageous clock suppressor in the clock signal generator makes it possible to rapidly readjust the current consumption.

In one advantageous refinement, the circuit arrangement is used to operate circuit parts whose current consumption depends on the clock at an optimized operating point.

Further improved adaptation can be achieved by means of a variable regulating delay of the setting apparatus.

The method for achieving the object provides for at least one part of a provided supply power to be tapped off, said part depending on a provided supply voltage and on a provided clock signal at a frequency. The frequency and/or the supply voltage is/are controlled such that the power tapped off and the supply power fed in are in a predefined relationship.

The method advantageously comprises: providing a supply power at an input node; tapping off a first part of the supply power provided; recording a second part of the supply power which is not tapped off; providing a clock signal at a frequency and providing the first part of the provided supply power using a supply voltage, the frequency and/or the supply voltage depending on the recorded second part of the supply power.

This method allows operation of a load to be adapted to the power conditions.

The operation of recording the magnitude of the second part comprises measuring a current in order to use it to infer the power not required by the load. The conclusion is advantageously drawn by comparing at least one desired current value with the recorded current and generating a clock control signal and/or a voltage control signal on the basis of the comparison.

The current advantageously flows away via a voltage limiting device which is coupled between the input node and a reference node, and a voltage dropped across the voltage limiting device is regulated in such a manner that the voltage does not exceed a predefined value. The voltage is limited, in a manner which is technically simple to implement, using a shunt.

The frequency and/or the supply voltage is/are advantageously increased if the current is greater than a first desired current value provided, and the frequency and/or the supply voltage is/are reduced if the current is less than a second desired current value provided. Fixing the desired current values makes it possible to adjust the width of a range inside which the current should lie.

In order to increase the flexibility, the circuit arrangement can be changed over between a first operating mode and a second operating mode. The at least one desired current value is provided in the first operating mode. At least one other desired current value is provided in the second operating mode. For example, operation which is very robust to load changes and in which a large amount of current flows through the voltage limiting device can thus be changed over to less robust but more energy-efficient operation.

The output current to be provided advantageously depends on the clock frequency in order to use the advantages of regulation for clocked loads. Clock signal suppression makes it possible to finely adjust the current consumption.

In order to adapt operation further, the frequency and/or the supply voltage is/are regulated with a predefinable delay. Regulation of the frequency and/or of the supply voltage on the basis of adaptive algorithms is used for the same purpose.

The use of this circuit arrangement is particularly advantageous if the power provided fluctuates to a significant extent. This is the case, for example, for chip cards which have a contactless interface and are supplied using an electromagnetic field. The field strength depends greatly on the distance between the chip card and the reading device.

FIG. 1 diagrammatically illustrates the principle of supplying power to a clocked load circuit 25.

A power supply device 20 provides power E1 for the load circuit 25. A voltage supply device 10 is connected downstream of the power supply device 20. The voltage supply device 10 feeds the load circuit 25 and provides a supply voltage VDD. However, the load circuit 25 draws only part E2 of the power E1 provided.

Provision is also made of a clock signal generator 9 which provides a clock signal CLK at an effective or average frequency. The load circuit 25 is operated in a clocked manner by the clock signal CLK.

The supply voltage VDD can be regulated by a voltage regulation means 11 which is coupled to the voltage supply device 10. The average frequency of the clock signal CLK can be regulated by a clock regulation means 91 which is coupled to the clock generator 9. Both the clock frequency regulation means 91 and the voltage regulation means 11 are driven by a setting device 23 which provides corresponding control signals S9 and S10.

The load circuit 25 requires only part E2 of the power E1 provided overall for operation. The part E2 required depends on the supply voltage VDD, the clock frequency and the power requirement of the active circuit parts inside the load circuit 25. If a circuit part inside the load circuit 25 is activated, the load circuit 25 draws more current, which is associated with an increased power requirement.

The clock frequency regulation means 91 and the voltage regulation means 11 are controlled on the basis of part of the power E1 which is not required to operate the load circuit 25. The two arrows which are passed from the power supply device 20 and the load circuit 25 to the setting device 23 and have the reference symbols SE1 and SE2 illustrate the determination of this part in FIG. 1. The power required E2 and the power provided E1 need not be compared directly, for example by means of subtraction; the part of the power which is not required can also be measured. This measured variable can then be compared with a desired variable. In one exemplary embodiment, the power can be measured by measuring a residual current by means of which power which is not required by the load circuit 25 flows away.

The setting apparatus 23 is also parameterized, which is illustrated by the reference symbol P in FIG. 1. During parameterization, desired values are predefined and are used as the basis for the regulating operation using the control signals S9, S10 provided by the setting apparatus 23. A desired current variable can thus be predefined.

In another exemplary embodiment, a delay setting operation can be alternatively or additionally carried out during parameterization between the detection of the surplus power and the subsequent regulating operation which depends on the latter, with the result that fluctuations in the power consumption and in the provision of power can be readjusted with a settable intensity and a settable speed. Furthermore, the setting device may also comprise adaptive algorithms which store the typical profile of the level of the power supply and allow it to be included in the regulating operation.

It should be noted that, in one exemplary embodiment, only one of the variables of the clock frequency and supply voltage VDD can also be regulated on the basis of the amount of power that is not required. The supply voltage VDD may thus be constant in such a case.

Figure 2:
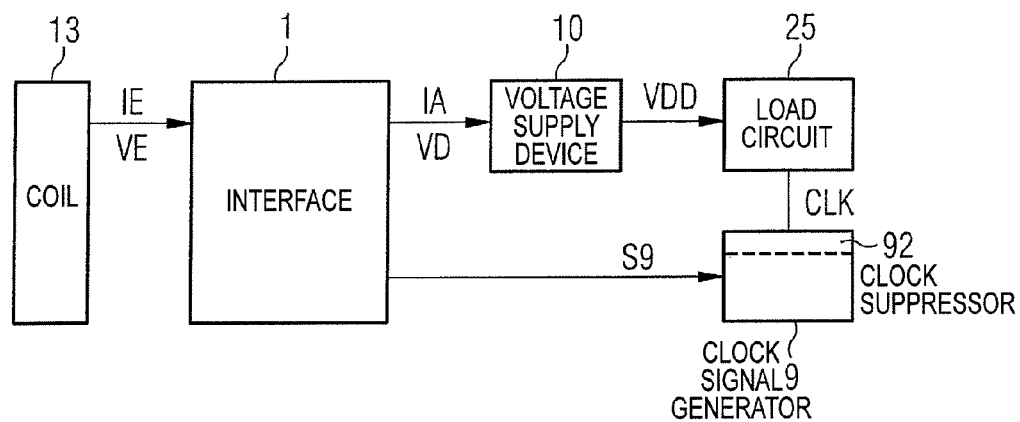
FIG. 2 shows a diagrammatic illustration of one exemplary embodiment of a circuit arrangement in a chip card.

FIG. 2 shows a diagrammatic illustration of one exemplary embodiment of a circuit arrangement in a chip card. The circuit arrangement comprises an inductive coupling element 13 in order to provide power for operating the circuit arrangement using an electromagnetic field. The coupling element 13 may be in the form of a coil. Fluctuations in the amount of power injected may result on account of the movement of the card in the electromagnetic field.

An interface 1 is coupled to the inductive coupling element 13, a voltage supply device 10 and a clock signal generator 9 being connected downstream of said interface. In this case, the voltage supply device 10 is in the form of a voltage regulator which regulates the voltage applied to the output node to a predefined value. In another exemplary embodiment, the voltage supply device 10 is designed in a particularly simple manner as a node for providing the power, in the case of which separate regulation is dispensed with.

In the exemplary embodiment illustrated in FIG. 1, a load circuit part 25 which is operated in a clocked manner is coupled to the voltage regulator 10 and to the clock signal generator 9.

The inductive coupling device 13 provides the interface 1 with an input current IE whose current intensity depends on the strength of the electromagnetic field. The voltage VE applied to the input of the interface 1 is also subject to fluctuations, based on a reference potential.

The interface 1 provides, at the output, a control signal S9 which is coupled to the clock signal generator 9. A supply current IA for the load circuit part 25 is also provided. The output voltage VD applied to the output of the interface 1 is regulated to a predefined supply voltage VDD for the load circuit part 25 by the voltage regulator 10, based on the reference potential. The supply voltage VDD may also be adapted to the current consumption.

It should be noted that the exemplary embodiment described below concentrates on the control of the clock signal generator 9, whereas the supply voltage VDD is regulated to a predefined value. In further exemplary embodiments, the supply voltage VDD is regulated in a similar manner instead of, or in addition to, the clock frequency by providing the voltage control signal and coupling it to the voltage supply device 10.

The clock generator 9 generates a periodic clock signal at a fundamental frequency. The load circuit part 25 is operated in a clocked manner on the basis of the clock signal CLK. A clock suppressor 92 at the output can be used to suppress individual clock pulses or a plurality of clock pulses if dips in the supply voltage VDD are detected. An effective frequency results on account of the clock suppression. The effective frequency of the clock signal CLK is less than or equal to the fundamental frequency. This makes it possible to reduce the current consumption in the case of a voltage drop which is detected at the voltage regulator 10 in order to stabilize the supply voltage VDD. Voltage dips may occur, for example, if the current consumption suddenly rises as a result of circuit parts starting operation. The effective frequency and/or the fundamental frequency is/are controlled by the control signal S9.

The current IA required to operate the load circuit part 25 depends on the effective frequency of the clock signal CLK. The output current IA is provided by the interface 1.

Figure 3:
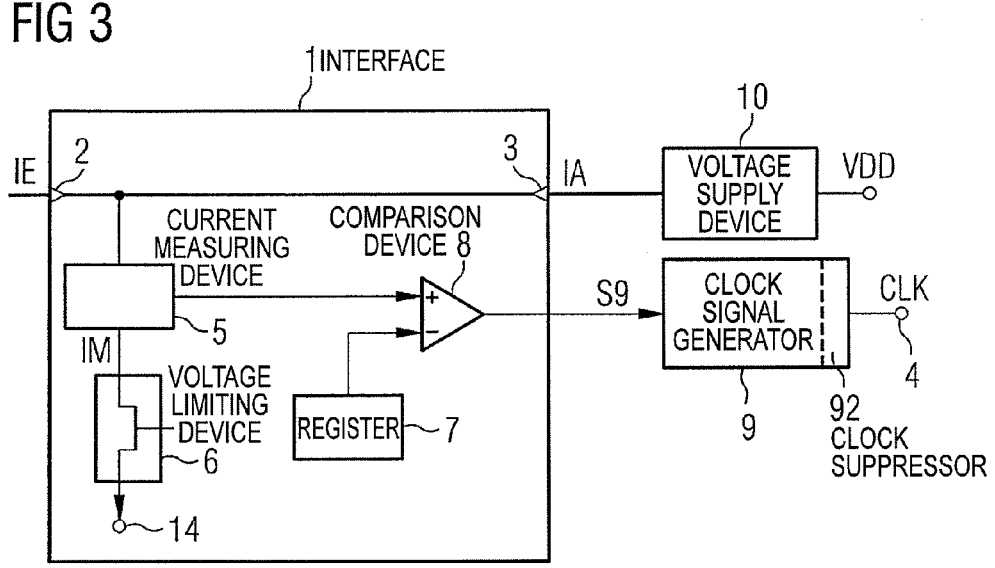
FIG. 3 shows a diagrammatic illustration of a detailed part of the exemplary embodiment.

FIG. 3 shows, in detail, the interface 1 having an input 2 and an output 3 which is connected to the input 2. The current path between the input 2 and the output 3 is tapped off using a shunt 6. Part of the input current IE applied to the input 2 can flow away to a reference node 14 via the shunt 6. The reference node 14 need not be directly connected to the reference potential. A current measuring device 5 which measures the current IM flowing away via the shunt 6 is connected upstream of the shunt 6.

A comparison device 8 and a register 7 are also provided in the interface 1. The current measuring device 5 and a register 7 are coupled to the inputs of the comparison device 8. The comparison device 8 provides, at the output, the control signal S9 which controls the fundamental frequency of the clock signal CLK generated by the clock signal generator 9. The clock signal CLK is available at an output 4 of the clock signal generator 9. The clock suppressor 92 is likewise illustrated in FIG. 2.

That part IM of the input current IE which is not required at the output 3 flows away via the shunt 6. At the same time, the shunt limits the voltage applied to the shunt. This avoids voltage spikes at the output 3 of the interface 1 in order to protect the circuit parts connected downstream.

The current intensity of the current IM flowing away is recorded by the current measuring device 5 and is compared with a desired current value stored in the register. This comparison is carried out digitally since the current measuring device 5 provides a digital measured value in this exemplary embodiment. However, it is also conceivable to carry out the comparison in an analog manner in which analog currents, the measured current and a reference current, are compared.

If the measured current IM is greater than the desired current value, the clock signal generator 9 is driven in such a manner that the fundamental frequency of the clock signal CLK is increased. This increases the current consumption of the load circuit part 25 connected downstream, with the result that better use is made of the power. The current flowing through the shunt 6 is consequently also reduced. If the current flowing through the shunt 6 is less than the predefined desired current value, the frequency of the clock signal CLK is reduced in order to reduce the current consumption of the load circuit part 25 connected downstream. This avoids voltage dips.

The comparison can also be carried out with a first desired current value, which is checked in order to determine whether it has been exceeded by the measured current IM, and with a second desired current value, which is checked in order to determine whether it has been undershot by the measured current IM.

The output voltage VD is also regulated by the voltage limitation of the shunt 6. In order to regulate the supply voltage VDD to a predefined value VDD, the output voltage VD is adjusted using the voltage regulator 10 connected downstream of the interface 1.

The aim is for a predefined current IM, which is predefined by the desired current value, to flow away through the shunt 6. In the case of discrepancies, the fundamental frequency of the clock signal CLK is reduced or increased. The inertia of the shunt 6 also makes it possible to average the field which can sometimes change rapidly and induces the input current IE.

In its simplest configuration, the shunt 6 may comprise a regulated transistor whose gate electrode is driven in such a manner that the voltage across the shunt 6 is regulated. The aim of this regulation is to avoid the voltage across the shunt 6 exceeding a predefined value. The shunt 6 may of course also be configured in a more complicated manner using additional components.

The clock frequency can be adapted to the power provided in a virtually optimum manner using the regulating operation described. A clock suppressor 92 connected downstream of the clock signal generator 9 is no longer absolutely necessary but may still be provided for the purpose of finely adjusting the effective clock frequency in order to react to rapid load changes, for example. This is the case, for example, if a further load which depends on the clock frequency is put into operation inside the circuit arrangement.

As a result of the regulating mechanism described, the fundamental frequency of the clock signal CLK is adapted to the effective frequency in a more accurate manner than would be the case if only a voltage drop sensor were used. A severe deviation of the effective clock frequency from the fundamental clock frequency is avoided.

What is claimed is:

1. A circuit arrangement for supplying power to, and clocking, clocked loads, and which is configured to receive a supply power and to provide a clock signal at a frequency and a supply voltage, wherein the frequency and/or the supply voltage are controlled by the circuit arrangement such that power tapped from the received supply power and the received supply power are in a predefined relationship.

2. The circuit arrangement as claimed in claim 1, said circuit arrangement comprising:
an input node at which the supply power is received;
a voltage supply device which is coupled to the input node and provides the supply voltage, at least one first part of the supply power being able to be tapped off at the voltage supply device;
a measuring device which is coupled to the input node in order to record a second part of the supply power which is not tapped off;
a clock signal generator configured to provide the clock signal; and
a setting device to which the measuring device is coupled, wherein the clock signal generator and/or the voltage supply device are controllable by the setting device.

3. The circuit arrangement as claimed in claim 2, wherein the measuring device is in the form of a current measuring device.

4. The circuit arrangement as claimed in claim 3, wherein the setting device comprises a comparison device configured to compare at least one desired current value with a current recorded by the current measuring device and to provide a clock control signal and/or a voltage control signal.

5. The circuit arrangement as claimed in claim 4, wherein the desired current value can be changed.

6. The circuit arrangement as claimed in claim 3, wherein a current to be measured by the current measuring device flows away via a voltage limiting device, the voltage limiting device being designed to regulate a voltage dropped across it in such a manner that the voltage does not exceed a predefined value.

7. The circuit arrangement as claimed in claim 6, wherein the voltage limiting device is in the form of a shunt.

8. The circuit arrangement as claimed in claim 4, wherein the voltage control signal controls the supply voltage.

9. The circuit arrangement as claimed in claim 7, wherein the supply voltage is increased if the current recorded is greater than a first desired current value provided, and wherein the supply voltage is reduced if the current recorded is less than a second desired current value provided.

10. The circuit arrangement as claimed in claim 4, wherein the clock control signal controls the frequency of the clock signal.

11. The circuit arrangement as claimed in claim 10, wherein the frequency is increased if the current recorded is greater than a first desired current value provided, and wherein the frequency is reduced if the current recorded is less than a second desired current value provided.

12. The circuit arrangement as claimed in claim 2, wherein the clock signal generator comprises a clock suppressor.

13. The circuit arrangement as claimed in claim 2, further comprising a load circuit which has a clock-dependent current consumption and is coupled to the clock signal generator and to the voltage supply device.

14. The circuit arrangement as claimed in claim 2, wherein a regulating delay of the setting device can be changed.

15. A method for supplying power to, and clocking, clocked loads, at least one part of a received supply power being tapped off, said part depending on a provided supply voltage and on a provided clock signal at a frequency, the frequency and/or the supply voltage being controlled such that the supply power tapped off and the received supply power are in a predefined relationship.

16. The method as claimed in claim 15, said method comprising:
receiving the supply power at an input node;
tapping off a first part of the supply power received;
recording a second part of the supply power which is not tapped off; and
providing a clock signal at a frequency and providing the first part of the provided supply power using a supply voltage, the frequency and/or the supply voltage depending on the recorded second part of the supply power.

17. The method as claimed in claim 16, wherein the operation of recording the second part comprises measuring a current.

18. The method as claimed in claim 17, further comprising:
comparing at least one desired current value with the recorded current; and
generating a clock control signal and/or a voltage control signal on the basis of the comparison.

19. The method as claimed in claim 17, further comprising:
the recorded current flowing away via a voltage limiting device which is coupled between the input node and a reference node; and
regulating a voltage dropped across the voltage limiting device in such a manner that the voltage does not exceed a predefined value.

20. The method as claimed in one claim 17, wherein the frequency is increased if the recorded current is greater than a first desired current value provided, and wherein the frequency is reduced if the recorded current is less than a second desired current value provided.

21. The method as claimed in claim 17, wherein the supply voltage is increased if the recorded current is greater than a first desired current value provided, and wherein the supply voltage is reduced if the recorded current is less than a second desired current value provided.

22. The method as claimed in claim 17, wherein the method changes over between a first operating mode in which the at least one desired current value is provided and a second operating mode in which at least one other desired current value is provided.

23. The method as claimed in claim 16, which comprises providing an output current which depends on the clock signal.

24. The method as claimed in claim 16, wherein the clock signal comprises suppressed clock pulses.

25. The method as claimed in claim 16, wherein the frequency and/or the supply voltage is/are regulated with a predefinable delay.

* * * * *